United States Patent [19]
Okamura et al.

[11] Patent Number: 4,906,516
[45] Date of Patent: Mar. 6, 1990

[54] LEATHER-LIKE FOAM SHEET FOR VACUUM FORMING

[75] Inventors: Chikaaki Okamura, Uji; Tamotu Nagao, Takatsuki, both of Japan

[73] Assignee: Sunstar Giken Kabushiki Kaisha, Osaka, Japan

[21] Appl. No.: 327,785

[22] Filed: Mar. 23, 1989

[51] Int. Cl.⁴ .............................................. B32B 3/26
[52] U.S. Cl. .................................. 428/215; 428/316.6; 428/317.1; 428/317.7; 428/318.6; 428/319.3; 428/319.7; 428/904
[58] Field of Search ..................... 428/151, 215, 316.6, 428/317.1, 317.7, 319.3, 319.7, 318.6, 904

[56] References Cited

U.S. PATENT DOCUMENTS 3,788,882  1/1974  Noone .............................. 428/316.6
3,873,407  3/1975  Kumata et al. ..................... 428/215
4,504,536  3/1985  Wong ................................ 428/151
4,575,471  3/1986  Wong ................................ 428/151
4,781,976  11/1988 Fujita et al. ..................... 428/318.6

Primary Examiner—William J. Van Balen
Attorney, Agent, or Firm—Wegner & Bretschneider

[57] ABSTRACT

A leather-like foam sheet for vacuum forming, which comprises:
(1) a transparent of semitransparent colored polyurethane elastomer film layer,
(2) a colored polyurethane elastomer film layer,
(3) a polyurethane adhesive layer,
(4) a thermoplastic resin foam layer (optional),
(5) a thermoplastic resin sheet layer, and
(6) a thermoplastic resin foam layer.

The foam sheet of the present invention has excellent resistance and forming properties and a high-grade leather-like appearance and a soft feeling to the touch similar to those of natural leather and is useful for a trim material of a car and for furniture and other miscellaneous goods having leather-like appearance, touch, and other properties.

6 Claims, No Drawings

LEATHER-LIKE FOAM SHEET FOR VACUUM FORMING

The present invention relates to a leather-like foam sheet for vacuum forming. More particularly, the present invention relates to a leather-like foam sheet comprising 5 or 6 layers which has a high-grade impression like natural leather and is soft and warm to the touch. The foam sheet is suitable for vacuum forming and is useful for a trim material of a car.

PRIOR ART

For a trim material of a car, there has been used a laminated product of a leather-like pattern-embossed PVC (polyvinyl chloride) sheet or PVC/ABS (acrylonitrile-butadiene-styrene) sheet (thickness: 0.3 to 1.0 mm) with a PVC foam or PO (polyolefin) foam. However, such a product has defects as follows:

(i) it does not have a high-grade impression like natural leather,
(ii) it does not have a natural color,
(iii) it has a cold appearance and is rough in touch after vacuum forming and lacks soft feeling.

BRIEF SUMMARY OF THE INVENTION

The present inventors have intensively studied an improved skin material free from the above-mentioned defects and have found that a laminated product wherein two layers of a polyurethane elastomer film layer and two to three layers of a thermoplastic resin layer are laminated to each other via an adhesive layer can be a laminated foam sheet useful for a skin material.

An object of the present invention is to provide a leather-like foam sheet for vacuum forming which comprises:

(1) a transparent or semitransparent colored polyurethane elastomer film layer,
(2) a colored polyurethane elastomer film layer,
(3) a polyurethane adhesive layer,
(4) a thermoplastic resin sheet layer, and
(5) a thermoplastic resin foam layer.

Another object of the present invention is to provide a leather-like foam sheet for vacuum forming which comprises:

(1) a transparent or semitransparent colored polyurethane elastomer film layer,
(2) a colored polyurethane elastomer film layer,
(3) a polyurethane adhesive layer,
(4) a thermoplastic resin foam layer,
(5) a thermoplastic resin sheet layer, and
(6) a thermoplastic resin foam layer.

These and other objects and advantages of the present invention will be apparent to skilled persons from the following description.

DETAILED DESCRIPTION OF THE INVENTION

The transparent or semitransparent colored polyurethane elastomer film layer (1) [hereinafter referred to as "transparent colored layer (1)]of the present invention comprises a composition containing a polyurethane elastomer, preferably carbonate type polyester urethane elastomer in view of durability, which is prepared by reacting a polyester diol (e.g. adipate, caprolactone, carbonate, etc.) or a polyoxyalkylene ether diol (e.g. polytetramethylene glycol (PTMG), polypropylene glycol, etc.) with a diisocyanate [diphenylmethane-4,4'-diisocyanate (MDI), tolylene diisocyanate (TDI), isophorone diisocyanate (IPDI), hexamethylene diisocyanate (HMDI), etc.] in the presence of a chain-extending agent (e.g. 1,4-butanediol, 1,6-hexanediol, etc.) at an equimolar ratio of NCO/OH=1/1. The above polyurethane elastomer is dissolved in a suitable solvent (e.g. dimethylformamide (DMF), methyl ethyl ketone (MEK), toluene, ethyl acetate etc.) to give 10 to 20% solution (% by weight, hereinafter the same). To the solution is added 3 to 15% pigments (e.g. carbon black, titanium white, organic azo pigments, organic phthalocianine pigments, etc.) and the mixture is throughly mixed. Finally, not more than 20% of silica powder is added to endow a transparency or semitransparency to the product. The above polyurethane elastomer solution may be combined with a crosslinking agent such as a polyisocyanate compound (e.g. HMDI, IPDI, etc.) when used. The use of the crosslinking agent provides a strong film with improved durability. The composition is applied to a release paper in an amount of from 20 to 150 g/m$^2$ and dried at 80° to 130° C. for several minutes to give a transparent colored layer (1) with a thickness of from 3 to 20 μm, preferably from 5 to 10 μm. When the layer has a thickness below 3 μm, an undesirable tear is produced during forming step, and when the layer has a thickness more than 20 μm, the product shows hard hand and shows less soft and warm touch, and hence, it is economically disadvantageous. The layer should have film properties such as an elongation at break of 200 to 600%, 100% modulus of elasticity of 100 to 500 kg/cm$^2$ (high hysteresis) and a softening point of 150° to 220° C., preferably 190° to 200° C.

The colored polyurethane elastomer film layer (2) of the present invention [hereinafter referred to as "colored layer (2)] comprises a composition containing the same polyurethane elastomer as employed in the transparent colored layer (1). In the case of the layer (2), a molecular weight of the elastomer is 80,000 to 200,000 and the layer should have film properties such as an elongation at break of 200 to 600%, and 100% modulus of elasticity of 30 to 200 kg/cm$^2$, preferably 50 to 120 kg/cm$^2$. Such polyurethane elastomer (preferably carbonate type polyester urethane elastomer) is treated like in the transparent colored layer (1). That is, it is dissolved in a solvent to give 10 to 40% solution, and to the solution is added coloring agents such as pigment or dye and the mixture is thoroughly mixed. The obtained solution is applied onto the transparent colored layer (1) or a release paper in an amount of from 100 to 250 g/m$^2$ and then dried at 80° to 130° C. for several minutes to give the colored layer (2) with a thickness of from 20 to 100 μm, preferably from 20 to 35 μm. When the layer has a thickness below 20 μm, the thickness further decreases after forming and a surface strength is lowered, and when the layer has a thickness more than 100 μm, the product shows hard hand, and hence, it is disadvantageous in economical viewpoint.

The polyurethane adhesive layer (3) of the present invention [hereinafter referred to as "adhesive layer (3)] can be prepared by applying onto the above colored layer (2) or a release paper a mixed composition of 30 to 70% solution of the above-mentioned carbonate type polyester urethane elastomer (molecular weight: 30,000 to 100,000, an elongation at break: 200 to 300%, 100% modulus of elasticity: 10 to 50 kg/cm$^2$) in a solvent and a polyisocyanate compound [TDI - TMP (trimethylolpropane) adduct, isocyanurate, HMDI - TMP adduct, etc.] as a crosslinking agent in an amount of from 100 to 200 g/m², and then drying at 80° to 130° C. for several minutes to give the desired layer with thickness of from 30 to 100 μm, preferably from 40 to 50 μm. When the layer has a thickness below 30 μm, there is a tendency to produce a tear or to peel off, and when the layer has a thickness more than 100 μm, there is a tendency to show a hard hand and to mar the soft and warm touch.

The thermoplastic resin foam layers (4) and (6) of the present invention [hereinafter referred to as "foam layer (4)" or "foam layer (6)"] provide the foam sheet of the present invention with a proper thickness and a property of cushion and attain an excellent forming property and a soft touch of the foam sheet. The foam layer (4) or (6) comprises PVC foam or PO [polypropylene (PP), a crosslinked polyethylene (PE) and the like] foam, preferably PVC foam. For example, a PVC foam can be prepared from a plastisol which contains PVC, a foaming agent (e.g. azodicarbonamide, dinitrosopentamethylenetetramine, diethyl azodicarboxylate, azobisisobutylonitrile, etc.), a plasticizer [e.g. a phthalic acid ester such as dioctyl phthalate (DOP), dibutyl phthalate (DBP), diundecyl phthalate (DUP) or butyl benzyl phthalate (BBP), a glycol ester such as diethylene glycol dibenzoate or pentaerythritol ester, a fatty acid ester such as butyl oleate or methyl acetylricinoleate, a phophoric acid ester such as tricresyl phosphate, trioctyl phosphate or octyl diphenyl phosphate, chlorinated paraffin, etc.], a stabilizing agent or a catalyst (e.g. dibutyltin dilaurate, dibutyltin maleate, dibutyltin phthalate, dibutyltin laurate, Ba-Zn stabilizer, etc.), a filler (e.g. calcium carbonate, bentonite, titanium oxide, ferric oxide, talc, etc.), and the like in a suitable amount. In case of the foam layer (4), the PVC foam is produced so that an expansion ratio is 1.5 to 3.0 and the produced foam has flexible PVC sheet properties such as a density of not more than 0.6 g/cm², a cell size of 50 to 150 μm, 100% modulus of 20 to 100 kg/cm², and a thickness of 0.2 to 1.5 mm, preferably 0.4 to 0.8 mm. When the thickness is below 0.2 mm, a proper degree of cushion property cannot be obtained after forming, and when the thickness exceeds 1.5 mm, a surging or a wrinkle is produced when forming and the formed product tends to have a decreased surface strength. In case of the foam layer (6), the PVC foam is produced so that an expansion ratio is 1.5 to 3.0 and the produced foam has a thickness of 0.5 to 4 mm, preferably 0.5 to 1.0 mm. When the thickness is below 0.5 mm, it is not fitted with a lined pat material and a property of cushion of the produced sheet is not sufficient, and when the thickness is more than 1.0 mm, it is difficult to form, especially to form in an acute shape.

The thermoplastic resin sheet layer (5) of the present invention [hereinafter referred to as "sheet layer (5)"] is prepared, for example, from a composition containing PVC as a thermoplastic resin. For example, a PVC plastisol is prepared by mixing 100 parts (by weight, hereinafter the same) of PVC and 50 to 150 parts, preferably 65 to 100 parts of a plasticizer (the same as above), and the PVC plastisol is heated at 130° to 250° C. to gelate, yielding the sheet (5) which is a flexible PVC sheet with a thickness of 0.3 to 1 mm, preferably 0.4 to 0.8 mm. When the thickness is below 0.3 mm, a tear is produced in vacuum forming, and when the thickness is more than 1 mm, a soft touch or a property of cushion is decreased. The sheet (5) can also be prepared from a composition containing the above-mentioned carbonate type polyester urethane elastomer with 100% modulus of 50 to 120 kg/cm² In this case, the sheet (5) is prepared so that the obtained sheet has a thickness of 0.05 to 0.2 mm.

As mentioned above, one embodiment of the foam sheet of the present invention comprises the transparent colored layer (1), the colored layer (2), the adhesive layer (3), the sheet layer (4) and the foam layer (5), which are laminated to each other in this order. The foam sheet of the present invention can be prepared, for example, in the following manner.

The composition for the transparent colored layer (1) is applied on a release paper having a leather-like embossed pattern and dried and thereto the composition for the colored layer (2) is applied and dried and then the mixed composition for the adhesive layer (3) is applied and dried to form three layers of (1) to (3).

Separately, the plastisol for the foam layer (5) is applied onto a release paper and heated to foam and thereto the composition for the sheet (4) is applied and heated to gelate to form two layers of (4) and (5).

Alternatively, the above layers may be individually formed by applying each composition to a release paper like the above.

Each of the above three layers and two layers or each of the five layers are laminated and adhered together via the adhesive layer (3). After the above laminating procedure, the release papers at both sides are peeled off to prepare a long roll of laminated product, which is aged at 30° to 60° C. for several days.

The foam sheet of the present invention constituted as above, has the following advantages:

(i) it has natural appearance and texture similar to those of high-grade leather, (ii) it has a soft and warm feeling to the touch even after vacuum forming and also it has less change of the soft feeling due to atmospheric temperature, (iii) since the transparent colored layer (1) at the surface is formed so as to have a surface pattern corresponding to the embossed pattern of the release paper, a change in gloss of the pattern is small even after vacuum forming as compared to that of the embossed pattern formed by a heated roll and also undesirable debossing (i.e. disappearance of the embossed pattern) is avoided.

Another embodiment of the foam sheet of the present invention comprises the transparent colored layer (1), the colored layer (2), the adhesive layer (3), the foam layer (4), the sheet layer (5) and the foam layer (6), which are laminated to each other in this order. The foam sheet of the present invention can be prepared by substantially the same procedure as in the case of the above-mentioned foam sheet. That is, after the three layers of (1) to (3) is formed by the same procedure as in the case of the above foam sheet, the plastisol for the foam layer (6) is applied to a separate release paper and heated to foam and thereto the composition for the sheet layer (5) is applied and heated to gelate and further the plastisol for the foam layer (4) is applied thereto and heated to foam, yielding three layers of (4) to (6). Then each of the above three layers are laminated and adhered together via the adhesive layer (3), followed by the same procedure as in the case of the above foam sheet.

Alternatively, each of six layers may be formed individually and laminated like in the above five layer foam sheet.

This foam sheet of the present invention constituted as above, especially due to the additional foam layer (4), has the following advantages:

(i) it has almost no debossing after vacuum forming as well as no disappearance of the pattern at the corner and preserves fine wrinkles of pattern to present a high-grade appearance, (ii) it has an excellent soft feeling to the touch, an improved surface strength, an insulating effect and warm feeling. Especially it has an appearance, a texture, a feeling to the touch and soft feeling similar to those of the product produced by adhering a natural leather on the surface.

The foam sheet of the present invention is particularly useful for a trim material of a car (e.g. instrument panel pad, door panel, pillar, instrument panel console, door trim, etc.) and also can be used for furniture, miscellaneous goods (surface material of a case, or a bag) and the like.

The present invention is illustrated by the following Examples but should not be construed to be limited thereto.

EXAMPLE 1

A plastisol containing PVC [homopolymer, mean polymerization degree (hereinafter referred to as "$\bar{P}$")=1700], diundecyl phthalate (DUP), a stabilizer, a filler and carbon black is applied onto a flat silicone releasing paper in a thickness (in dry) of 100 $\mu$m, which is gellated at 200° C. for 1 minute. Thereto a foaming sol containing PVC (homopolymer, $\bar{P}$=1500), DUP, a stabilizer, a filler and a foaming agent is applied in a thickness (in wet) of 0.4 mm. The resultant is gellated, melted and foamed at 210° C. for 2.5 minutes. After cooling, the silicone releasing paper is peeled off to give a PVC foam comprising a skin layer in a thickness of 100 $\mu$m and a foam layer with a thickness of 2.0 mm (expansion ratio: 5).

Separately, onto a release paper laminated with a polypropylene (PP) having a embossed pattern is applied a coloring solution, which is prepared by adding a coloring agent and silica powder to a solution of a carbonate type polyester urethane elastomer [elongation at break (hereinafter referred to as "ELB"): 300%, 100% modulus (hereinafter referred to as "100% M"): 250 kg/cm$^2$, thermosoftening point: 190° C.], in a thickness of 7 $\mu$m, and the resultant is dried at 100° C. for 1.5 minutes. Thereto is applied a coloring solution, which is prepared by adding a coloring agent to a solution of a carbonate polyester urethane elastomer (ELB: 400%, 100% M: 50 kg/cm$^2$, softening point: 170° C.), in a thickness of 25 $\mu$m. The resultant is then dried at 100° C. for 2 minutes. Further thereto a mixed composition comprising polytetramethylene glycol (PTMG) urethane prepolymer and a polyisocyanate compound is applied as an adhesive layer in a thickness of 45 $\mu$m, which is heated at 80° C. for 2 minutes to evaporate the solvent. Before complete curing, the skin layer of the above PVC foam is laminated onto the adhesive layer and the laminated product is rolled and then cured at 50° C. for 72 hours to complete a curing reaction, followed by peeling off the PP laminated release paper to give the desired laminated foam sheet.

This foam sheet is employed for a surface material and subjected to a vacuum forming at a surface temperature of 150° to 160° C., and at the same time it is attached to a core material to prepare an instrument panel pad or a pillar having a high-grade appearance and an excellent feeling of cushion.

EXAMPLE 2

In accordance with the procedure as described in Example 1, a laminated foam sheet with a total thickness of about 2.3 mm is prepared comprising the following PVC foam and three urethane layers.

[PVC foam]

Skin layer: a thickness of 200 $\mu$m, $\bar{P}$ of PVC=2500
Foam layer: a thickness of 2.0 mm, $\bar{P}$ of PVC=2000 (expansion ratio: 5)

[Three urethane layers]

Transparent colored layer (1): a thickness of 7 $\mu$m, made of carbonate type polyester urethane
Colored layer (2): a thickness of 30 $\mu$m, made of carbonate type polyester urethane
Adhesive layer 3): a thickness of 60 $\mu$m, made of carbonate type polyester urethane Employing this foam sheet, a vacuum forming and an integral patching are carried out to prepare a door trim and a pillar.

EXAMPLE 3

In accordance with the procedure as describe in Example 1, a laminated foam sheet with a total thickness of about 2.6 mm is prepared comprising the following PVC foam (additionally a ground layer is included for the foam layer) and three urethane layers.

[PVC foam]

Skin layer: a thickness of 400 $\mu$m, $\bar{P}$ of PVC=2500
Foam layer: a thickness of 2.0 mm, $\bar{P}$ of PVC=1700 (expansion ratio: 4)
Ground layer: a thickness of 100 $\mu$m, P of PVC=2000

[Three urethane layers]

The same as in Example 2

Employing this foam sheet, a vacuum forming and an integral patching are carried out to prepare a door trim having an excellent feeling of cushion.

EXAMPLE 4

[PO foam]

A crosslinked PE / PP foam (expansion ratio: 30) with a thickness of 3 mm is subjected to a primer treatment at one side with an urethane adhesive and thereto a polyether urethane film (softening point: 140° C.) in a thickness of 25 $\mu$m and a polyester urethane film (softening point: 160° C.) in a thickness of 50 $\mu$m are laminated wherein PP foam and polyester urethane film are fused with heating at a temperature higher than the softening point of the polyether urethane film.

[Three urethane layers]

These are prepared in accordance with the procedure as described in Example 1.
Transparent colored layer (1): a thickness of 5 $\mu$m, made of carbonate type polyester urethane (100% modulus: 150 kg/cm$^2$)
Colored layer (2): a thickness of 25 $\mu$m
Adhesive layer (3): a thickness of 50 $\mu$m, made of PTMG urethane The above PO foam and the three urethene layers are laminated in the same manner as described in Example 1 to give a laminated foam sheet. After vacuum forming at a surface temperature of 130° to 150° C., a light forming foam sheet was prepared without an unevenness of the foam layer, a break of the skin layer or a disappearance of pattern. The obtained sheet has an improved surface strength and an excellent insulating effect as well as a warm feeling and can be employed for a pillar or miscellaneous goods (cases).

EXAMPLE 5

Onto a flat silicone release paper is applied a foaming sol containing PVC ($\bar{P}$=1700), trioctyl trimellitate (TOTM, a plasticizer), a stabilizer, carbon black, a foaming agent and a filler in a thickness (in dry) of 0.2 mm, which is foamed at 200° C. for 1 minute (expansion ratio: 2). Thereto is applied a plastisol containing PVC (P=3500), TOTM, a stabilizer, a filler and carbon black in a thickness (in dry) of 0.5 mm, which is gellated at 200° C. for 1 minute. Further thereto the former foaming sol is applied in a thickness (in wet) of 0.3 mm, which is gellated and foamed at 220° C. for 2.5 minutes (expansion ratio: 2). After cooling, the silicone paper is peeled off to give a PVC foam with a total thickness of 1.5 mm.

Separately, onto a release paper laminated with PP having an embossed pattern is applied a coloring solution, which is prepared by adding a coloring agent and silica powder to a solution of a carbonate type polyester urethane elastomer (100% M: 300 kg/cm$^2$, thermosoftening point: 180° C.), in a thickness (in dry) of 7 μm, which is dried at 100° C. for 1 minute. Thereto is applied a coloring solution, which is prepared by adding a coloring agent to a solution of carbonate type polyester urethane elastomer (100% M: 60 kg/cm$^2$, softening point: 160° C.), in a thickness of 30 μm, which is then dried at 100° C. for 2 minutes. Further thereto a mixed composition comprising carbonate type polyester urethane elastomer (100% M: 30 kg/cm2) and a polyisocyanate compound is applied in a thickness (in dry) of 60 μm, followed by evaporation of the solvent at 90° C. for 2 minutes. Before curing is completed, to the adhesive layer is laminated the firstly applied foam layer of the above PVC foam. The laminated product is rolled and cured at 50° C. for 72 hours to complete the curing reaction, followed by peeling off the PP laminated paper to give the desired laminated foam sheet.

Employing this foam sheet for a skin material, a vacuum forming is carried out at 160° to 180° C. and thereinto urethane is poured to form, yielding an instrument panel pad or console having a high-grade appearance, an excellent soft feeling or feeling of cushion, and a desired high durability.

COMPARATIVE EXAMPLE 1

The procedure of Example 1 is repeated except that a thickness (in wet) of the former foaming sol is 0.4 mm, a thickness (in wet) of the latter foaming sol is 0.2 mm and an expansion ratio is 3 to give a laminated foam sheet.

When this sheet is used for a skin layer as in Example 1, the surface urethane layer produced wrinkles during vacuum forming and had a decreased mechanical strength at the surface such as scratch hardness.

EXAMPLE 6

In accordance with the procedure as described in Example 5, a laminated foam sheet is prepared which comprises the following PVC foam and three urethane layers.

[PVC foam]

The same as in Example 5

[Three urethane layers]

Transparent colored layer (1): a thickness of 7 μm, made of a carbonate type polyester urethane (100% M: 150 kg/cm$^2$, softening point: 190° C.)

Colored layer (2): a thickness of 30 μm, made of a carbonate type polyester urethane (100% M: 100 kg/cm$^2$ thermosoftening point: 170° C.)

Adhesive layer (3): a thickness of 50 μ, made of a carbonate type polyester urethane (100% M: 30 kg/cm$^2$)

Employing this sheet, a vacuum forming is carried out at a surface temperature of 160° to 190° C. and thereinto urethane is poured to foam, yielding an excellent full instrument panel pad.

The foam sheets of the present invention is compared with commercially available products for their various properties as shown in the following Table 1.

TABLE 1

| | Present invention | | | Commercially available product | | | | | | | |
|---|---|---|---|---|---|---|---|---|---|---|---|
| | Ex. 3 | Ex. 4 | Ex. 5 | (a) | (b) | (c) | (d) | (e) | (f) | (g) | (h) |
| Vacuum forming property | o | o | o | o | X | o | X | X | o | o | o |
| Soft feeling (measured with Asker C-tester) | 45 | 30 | 53 | 45–75 | 30 | 53 | 40 | 55 | 85 | 55 | 75 |
| Appearance (degree of color and gloss) | o | o | o | W | W | W | o | W | W | W | W |
| Light resistance (discoloration or deterioration)*1 | o | o | o | o | W–o | o | X | W–X | o | o | o |
| Heat resistance (discoloration or deterioration)*2 | o | o | o | o | W–o | o | X *3 | W | o | o | o |
| Feeling to the touch | o | o | o | W | W | W | o | o | X *4 | X–W *5 | X *6 |
| Debossing during forming | o | o | — | o | — | o | — | — | — | — | — |
| Abrasion resistance (grade) (Taber abrasion test) (CS-10, 1 kg, 1000 times) | 5 | 4 | 4.5 | 4—3.5 *7 | 4–3.5 *7 | 4 | 3 | 4.5 | 4 | 3–4 | 4 |

[Note 1] In the above Table 1, commercially available products manufactured by other companies, wherein (a), (b), (c) and (d) are used for door trim, and (e), (f), (g) and (h) are used for instrument panel pad, have the following structure:
(a): 0.35 mm PVC sheet + 2.5 mm PE foam
(b): 0.35 mm PVC sheet + pat material of slab urethane
(c): 0.45 mm skin layer + flexible PVC + foam layer (total thickness 2.5 mm)
(d): high grade natural leather (calf) + slab urethane

TABLE 1-continued (e): natural leather used for vehicles and furniture
(f): PVC/ABS sheet for forming instrument panel pad
(g): flexible PVC foam sheet
(h): laminated product of PVC/ABS sheet and PP foam
The products of (e) and (f) are backed with urethane foam having a thickness of 10 mm (for inst).
[Note 2] Evaluation of the properties was shown in the following criterion.
o: Good, Δ: Slightly good, X: Not good
[Note 3]: The star-marked items have the following meanings.
*1: Exs. 3 and 4, and (a), (b), (c) and (d) ... BP = 83° C., exposed for 500 hours
Ex. 5, and (e), (f), (g) and (h) ... BP = 83° C., S.W.O. M., exposed for 600 hours
*2: Exs. 3 and 4, and (a), (b), (c) and (d) ... 100° C. × 500 hours
Ex. 5, and (e), (f), (g) and (h)... 110° C. × 400 hours
*3: Discoloration
*4: much crisp
*5: tacky
*6: crisp
*7: gloss change As is clear from the results shown in Table 1, the foam sheet of the present invention has an excellent forming property and a light or heat resistance. Further, due to the appearance and feeling to the touch properties of the foam sheet of the present invention, the use thereof provides a high-grade appearance and a soft feeling to the touch similar to those of natural leather.

What is claimed is:

1. A leather-like foam sheet for vacuum forming which comprises:
    (1) a transparent or semitransparent colored polyurethane elastomer film layer,
    (2) a colored polyurethane elastomer film layer,
    (3) a polyurethane adhesive layer,
    (4) a thermoplastic resin sheet layer, and
    (5) a thermoplastic resin foam layer.

2. The foam sheet of claim 1 wherein each layer has a thickness of (1): 3° to 20 μm, (2): 20 to 100 μm, (3): 30 to 100 μm, (4): 30 to 700 μm, and (5): 1 to 4 mm.

3. The foam sheet of claim 1 wherein the thermoplastic resin sheet layer (4) is made of a flexible polyvinyl chloride sheet and the thermoplastic resin foam layer (5) is made of a polyvinyl chloride foam.

4. A leather-like foam sheet for vacuum forming which comprises:
    (1) a tranparent of semitransparent colored polyurethane elastomer film layer,
    (2) a colored polyurethane elastomer film layer,
    (3) a polyurethane adhesive layer,
    (4) a thermoplastic resin foam layer,
    (5) a thermoplastic resin sheet layer, and
    (6) a thermoplastic resin foam layer.

5. The foam sheet of claim 4 wherein each layer has a thickness of (1): 3 to 20 μm, (2): 20 to 100 μm, (3): 30 to 100 μm, (4): 0.2 to 1.5 mm, (5): 0.3 to 1 mm, and (6): 0.5 to 4 mm.

6. The foam sheet of claim 4 wherein the thermoplastic foam layers (4) and (6) are made of polyvinyl chloride foam and the thermoplastic resin sheet layer (5) is made of a flexible polyvinyl chloride sheet.

* * * * *